(12) United States Patent
Monroe et al.

(10) Patent No.: US 7,197,330 B1
(45) Date of Patent: Mar. 27, 2007

(54) DUAL PORT WIRELESS MODEM FOR CIRCUIT SWITCHED AND PACKET SWITCHED DATA TRANSFER

(75) Inventors: Daniel R. Monroe, Woodland Park, CO (US); Charles L. Lindsay, Monument, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/524,767

(22) Filed: Mar. 14, 2000

(51) Int. Cl.
*H04B 1/38* (2006.01)
*H04M 1/00* (2006.01)

(52) U.S. Cl. ........... 455/557; 455/558; 455/556.1; 455/445; 370/352; 370/465; 375/222

(58) Field of Classification Search ......... 455/422, 455/556, 557, 556.1–556.2, 422.1, 558, 445, 455/90.1–90.2; 370/351–356, 401, 465–467; 375/222, 370
See application file for complete search history.

(56) References Cited

U.S. PATENT DOCUMENTS

| | | | |
|---|---|---|---|
| 3,656,112 A | 4/1972 | Paull | |
| 4,388,690 A | 6/1983 | Lumsden | |
| 4,412,292 A | 10/1983 | Sedam et al. | |
| 4,578,540 A | 3/1986 | Borg et al. | |
| 4,646,084 A | 2/1987 | Burrowes et al. | |
| 4,766,548 A | 8/1988 | Cedrone et al. | |
| 5,091,713 A | 2/1992 | Horne et al. | |
| 5,295,178 A | 3/1994 | Nickel et al. | |
| 5,302,947 A | 4/1994 | Fuller et al. | |
| 5,305,312 A * | 4/1994 | Fornek et al. | 370/264 |
| 5,418,524 A | 5/1995 | Fennell | |
| 5,434,911 A | 7/1995 | Gray et al. | |
| 5,436,960 A | 7/1995 | Campana, Jr. et al. | |

(Continued)

FOREIGN PATENT DOCUMENTS

| | | | |
|---|---|---|---|
| EP | 0849682 | | 6/1998 |
| WO | WO 95/25407 | * | 9/1995 |
| WO | WO 01/22193 | | 3/2001 |

OTHER PUBLICATIONS

Morassi et al, "Real Time Simulation of Fax Transmission on the Transparent GSM Data Service", 5th IEEE International Symposium on Personal, Indoor and Mobile Radio Communications, 1994, pp. 944-953.

(Continued)

*Primary Examiner*—Matthew D. Anderson
*Assistant Examiner*—Tuan Tran
(74) *Attorney, Agent, or Firm*—Blakely, Sokoloff, Taylor & Zafman LLP

(57) ABSTRACT

A dual port external wireless modem is disclosed. According to one embodiment, the external wireless modem receives command and control information over a primary serial port, and real-time data over a secondary serial port. The primary serial port is further configured to received packet switched data, such as short message service messages, while the secondary serial port is configured to received circuit switched data. An RF transceiver in the wireless modem modulates data and control received over the respective serial ports, preferably using a GSM protocol stack. According to an embodiment, the circuit switched and packet switched data received at the wireless modem can be simultaneously transmitted by the RF transceiver without interrupting the circuit switched data transfer, thereby avoiding a context switch and a loss of throughput.

27 Claims, 5 Drawing Sheets

U.S. PATENT DOCUMENTS

| | | |
|---|---|---|
| 5,451,938 A | 9/1995 | Brennan, Jr. |
| 5,461,558 A | 10/1995 | Patsiokas et al. |
| 5,475,867 A | 12/1995 | Blum |
| 5,481,259 A | 1/1996 | Bane |
| 5,493,287 A | 2/1996 | Bane |
| 5,537,458 A | 7/1996 | Suomi et al. ................. 379/59 |
| 5,559,870 A | 9/1996 | Patton et al. ............... 379/107 |
| 5,590,179 A | 12/1996 | Shincovich et al. |
| 5,608,643 A | 3/1997 | Wichter et al. |
| 5,617,084 A | 4/1997 | Sears |
| 5,619,508 A | 4/1997 | Davis et al. ................ 370/495 |
| 5,631,636 A | 5/1997 | Bane |
| 5,640,155 A | 6/1997 | Springer |
| 5,663,933 A | 9/1997 | Eitrich et al. |
| 5,673,252 A | 9/1997 | Johnson et al. |
| 5,684,472 A | 11/1997 | Bane |
| 5,726,646 A | 3/1998 | Bane et al. |
| 5,726,764 A | 3/1998 | Averbuch et al. |
| 5,729,544 A * | 3/1998 | Lev et al. ................... 370/352 |
| 5,778,024 A | 7/1998 | McDonough ................ 375/216 |
| 5,809,415 A | 9/1998 | Rossmann .................. 455/422 |
| 5,862,474 A * | 1/1999 | Kimball ..................... 455/418 |
| 6,014,089 A | 1/2000 | Tracy et al. |
| 6,026,086 A * | 2/2000 | Lancelot et al. ............ 370/353 |
| 6,038,252 A * | 3/2000 | Mizutani et al. ............ 375/222 |
| 6,038,491 A | 3/2000 | McGarry et al. |
| 6,058,433 A * | 5/2000 | Gilbert ....................... 709/250 |
| 6,124,806 A | 9/2000 | Cuningham et al. |
| 6,134,608 A | 10/2000 | Jacober et al. |
| 6,243,377 B1 * | 6/2001 | Phillips et al. .............. 370/354 |
| 6,278,706 B1 * | 8/2001 | Gibbs et al. ................ 370/352 |
| 6,301,488 B1 | 10/2001 | Alos et al. |
| 6,363,355 B1 | 3/2002 | Morrison et al. |
| 6,377,815 B1 * | 4/2002 | Krishnan et al. ........ 455/553.1 |
| 6,384,739 B1 | 5/2002 | Roberts, Jr. |
| 6,418,324 B1 | 7/2002 | Doviak et al. |
| 6,438,384 B1 * | 8/2002 | Chen .......................... 455/462 |
| 6,442,625 B1 | 8/2002 | Robinson et al. |
| 6,934,551 B1 * | 8/2005 | Kuriyan ...................... 455/466 |

OTHER PUBLICATIONS

Bolton, "The Cellular Way to Retrieve Data", Transmission & Distribution, 1994, pp. 54, 57, 59.

Murch et al, "Cellular Data Service Over GSM", Telecommuncations, 1995, pp. 63-71.

Anonymous, "GSM Modules for Remote Applications", Electronic Times, 1998.

Orr, "Cell Phones Act as Modems", Computer Dealer News, 1994, p. 33.

Jian Cai and David J. Goodman, "General Packet Radio Service in GSM", Oct. 1997, IEEE Communications Magazine, pp. 122-131.

* cited by examiner

DUAL PORT WIRELESS MODEM FOR CIRCUIT SWITCHED AND PACKET SWITCHED DATA TRANSFER

CROSS REFERENCE TO RELATED APPLICATIONS

This application is related to copending U.S. patent application Ser. No. 09/398,724, filed Sep. 20, 1999, entitled, "DATA TERMINAL APPARATUS", 09/444,020, entitled, "EVENT DETECTION AND NOTIFICATION USING GSM", and 09/444,044, entitled, "OPERATOR INDEPENDENT, TRANSPARENT WIRELESS MODEM MANAGEMENT", both filed Nov. 19, 1999, which are all incorporated herein by reference in their entirety.

BACKGROUND

1. Field of the Invention

The present invention is generally related to the field of wireless modems, and more particularly to a dual port wireless modem that handles circuit switched and packet switched data.

2. Background of the Invention

In existing external wireless modems, the wireless modem is configured to be coupled with a single external device, typically through a single serial port. When communication using the wireless modem is desired, data and control signals are received over the single serial port and modulated through the wireless modem so that the data and control signals are passed over an over-the-air interface using a wireless protocol such as GSM.

For example, FIG. 1 depicts a known external wireless modem 100. The wireless modem 100 consists of a microprocessor 104, a read only memory ("ROM") 112, a random access memory ("RAM") 108, for holding runtime variables for the microprocessor 104, and an RF transceiver 116, for modulating and receiving data and control signals to and from the over-the-air interface 128. Since the wireless modem 100 is external, a single serial port 120 is provided for communicatively coupling the wireless modem 100 to external equipment, usually via a physical communication line such as a serial cable.

A drawback to known external wireless modems is that all communications with the terminal equipment pass through the same serial port 120. For example, a particular terminal equipment may be desirous of communicating real-time data via a circuit switched data (hereinafter "CSD") call to a particular piece of remote equipment. If, for some reason, the terminal equipment suddenly needs to send non real-time data to the remote equipment, the terminal equipment must somehow interleave the non real-time data with the real-time data and communicate it to the wireless modem 100.

While by itself, the interleaving of non real-time data with real-time data may not cause significant problems at the terminal equipment. Problems, however, are presented at the wireless modem 100. This is so because the wireless modem must essentially make a context switch between real-time and non real-time data transfer, as the non real-time data is usually sent via a more efficient packet-type data transfer, such as short message service (hereinafter "SMS") messages, rather than a CSD transfer.

For a microprocessor with limited computational abilities and resources, the effects of a context switch on memory resources can be significant, as a decision to switch between transfer modes will cause an interruption in the real-time data flow.

For instance, FIG. 2 depicts a known process for switching between transfer modes (contexts) in a wireless modem. In step 204, the single serial port 120 is initialized. At step 208, a CSD call is initialized, for example by the terminal equipment sending or causing an "ATDTxxxxxxx" command to be received at the wireless modem 100. The command in step 208 will cause the wireless modem 100 to dial a telephone number ("xxxxxxx") and connect to remote equipment via the RF transceiver 116. The remote equipment will send back a "CONNECT xxxx" signal, which is received at the wireless modem 100 in step 212, thereby establishing a CSD call.

At step 216, data transfer over the wireless modem 100 begins—transferring data from the terminal equipment to the remote equipment. At step 220, a periodic poll will take place to determine if a SMS command has been received at the wireless modem 100 from the terminal equipment. If an SMS command has been received, then in step 232, the CSD transfer over the serial port 120 is interrupted, and in step 236 a SMS data transfer is initialized. In step 240, the SMS data transfer occurs over the RF transceiver.

In step 244, a test is performed to determine if the SMS data transfer is complete. If the transfer is not complete, then the process continues to step 240. Otherwise, in step 248, a command, for example "ATO" is received over the serial port 100 to cause the wireless modem 100 to make a context switch back to the CSD mode. Next, the process continues to step 216, where the CSD transfer is resumed.

After step 220, if there is not a SMS message, then in step 224 a test is performed to determine whether the CSD call has ended. Usually, an "ATH" command is received over the serial port 120. If the CSD call has not ended, then processing continues to step 216. Otherwise, processing continues to step 228, where the CSD call is ended and processing terminates.

Using the wireless modem and process described above in a real-time surveillance or control environment can have drawbacks. For instance, the wireless modem may be deployed in a school bus and real-time video could be fed through the serial port 120. An alarm condition may occur in the school bus. When the alarm condition occurs, the real-time data stream is interrupted while the alarm condition is fed over the serial port 120, thereby causing important real-time information to be lost.

Moreover, it may also be desired that non real-time data be received by the wireless modem 100, for example by way of an SMS message while a CSD call is in progress. In the wireless modem's present configuration, receipt of SMS data is not possible until the CSD call is terminated.

In circumstances where the real-time data transfer is critical, or it is highly undesirable to interrupt the CSD transfer, the present wireless modem 100 has significant drawbacks. Essentially, the channel between the wireless modem 100 and the terminal equipment has two mutually exclusive modes (CSD or SMS) that can drain processing resources in the wireless modem and interrupt critical real-time communications.

SUMMARY OF THE INVENTION

A dual port external wireless modem is disclosed. According to one embodiment, the wireless modem comprises microprocessor, a read only memory coupled to the microprocessor, a random access memory coupled to the microprocessor, the random access memory comprising a transmission buffer, a RF transceiver coupled to the microprocessor, the RF transceiver configured to operate with the microprocessor to transmit and receive wireless signals, and a dual port serial port coupled to the microprocessor, the dual port serial port having a primary serial port and a secondary serial port, the primary serial port configured to receive data for circuit switched data transfer, and the secondary serial port configured to receive data for packet switched data transfer.

According to one embodiment, the read only memory comprises a wireless protocol stack, a command parser, and a data router, wherein the command parser examines command and control signals received over the primary serial port, and the data router directs data received over the primary serial port to the transmission buffer for transmission over the RF transceiver, directs data received over the secondary serial port to the RF transceiver, and further directs data received by the RF transceiver to the primary serial port.

Methods for operating the dual port external wireless modem, and a computer readable medium holding the same are also disclosed.

DETAILED DESCRIPTION OF THE PREFERRED EMBODIMENTS

Figure 1:
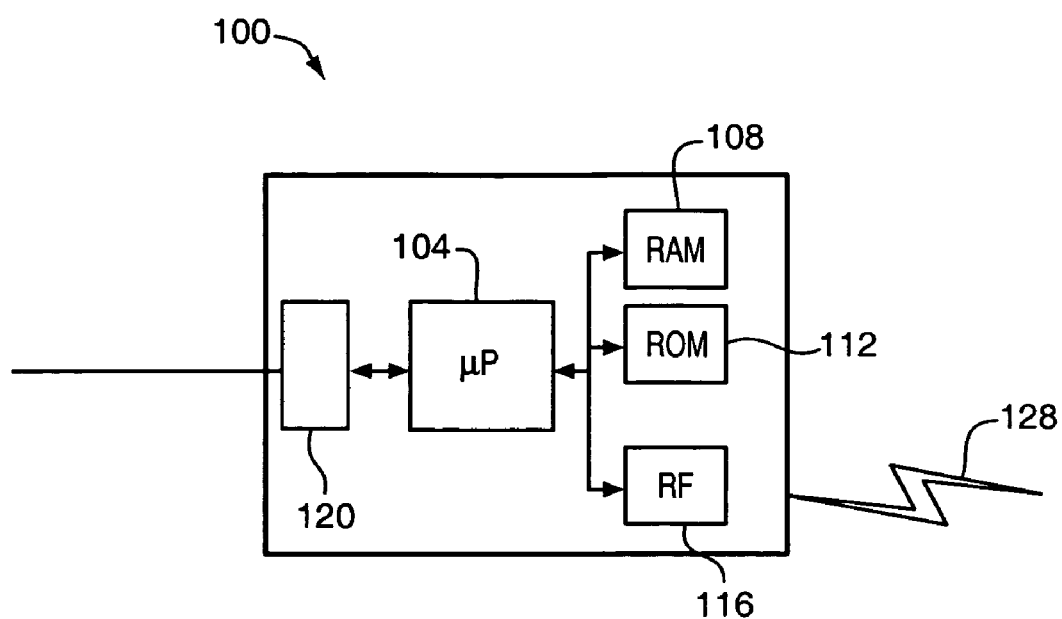
FIG. 1 depicts a known wireless modem.
Figure 2:
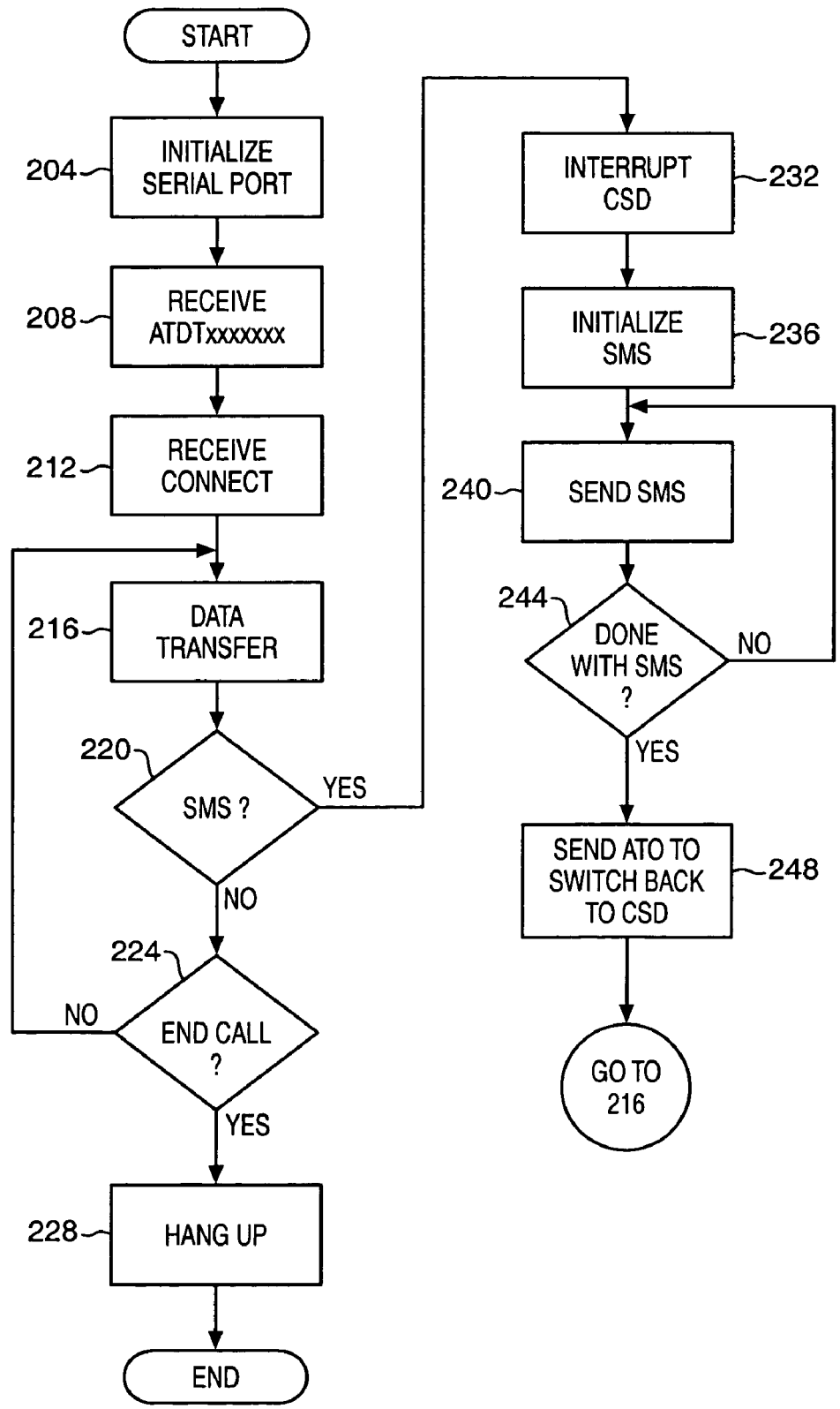
FIG. 2 is a flowchart of a known processing methodology for the wireless modem.
Figure 3:
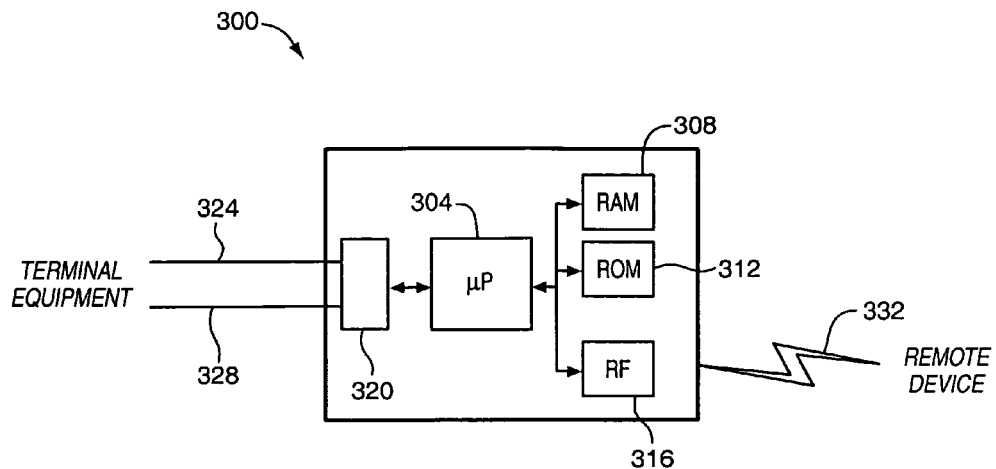
FIG. 3 depicts an embodiment of a dual port wireless modem.

FIG. 3 depicts a block diagram of a dual port external wireless modem 300. According to this embodiment, the wireless modem 300 comprises a microprocessor 304, a RAM 308, for storing runtime data, and a ROM 312, for storing persistent data, such as executable object code, and a RF transceiver 316, which is preferably configured to receive and transmit data in both a circuit switched and a packet switched mode. The RAM 308, ROM 312, and RF transceiver 316 are communicatively coupled to the microprocessor 304.

The wireless modem 300 further comprises a dual port serial port 320. According to one embodiment, the dual port serial port 320 is a multi-port RS-232 communications chip. Significantly, the wireless modem 300 is configured to receive, simultaneously, data over both serial ports of the dual port serial port 320. Command and control communications between the wireless modem 300 and terminal equipment flow through a primary serial port 324 in the dual port serial port 320. Actual data, for instance real-time data, generally flows through the secondary serial port 328 in the dual port serial port 320. However, according to one embodiment, a limited number of commands are also allowed to flow over the secondary serial port 328.

Figure 4:
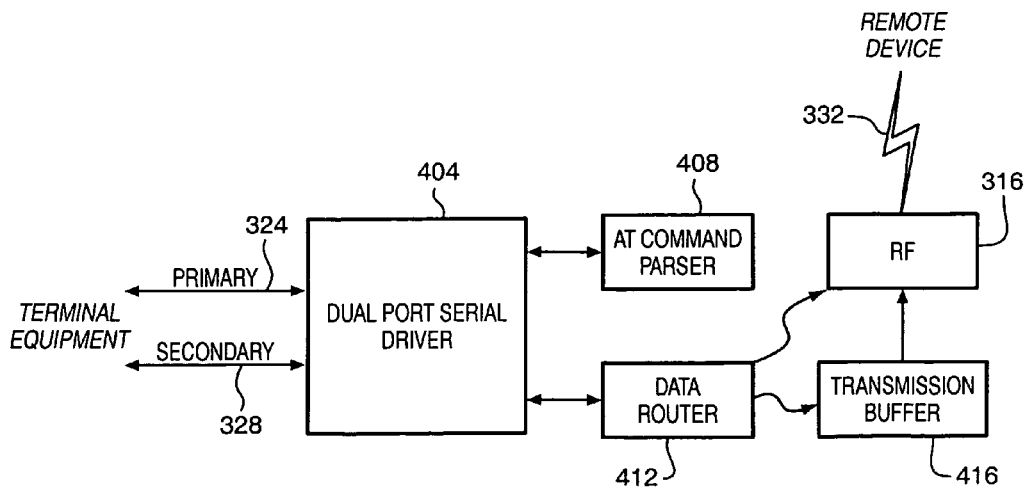
FIG. 4 is a functional block diagram of the dual port wireless modem.

Once data is received by the wireless modem 300, it is then routed for transmission to the RF transceiver 316 over an over-the-air interface 332, for instance the GSM or GPRS protocols. Further details of data parsing and routing are now described with reference to FIG. 4, which is a functional block diagram of the dual port external wireless modem 300.

A dual port serial driver 404 handles incoming transmissions from both the primary serial port 324 and the secondary serial port 328. As data is received, it is first examined by the AT command parser 408. If command and control signals are only passed over the primary serial port 324, then the AT command parser 408 need only examine signals from the primary serial port 324. However, if AT commands can also be transferred over the secondary serial port 328, then the secondary serial port 328 is also examined. According to one embodiment, AT command parser 408 monitors only a limited number of commands on the secondary serial port 328. For example, the AT command parser 408 can monitor for a "hang up" or "disconnect" signal. Moreover, the AT command set can be extended to include a new command "AT~S2PORT=[value]", where a 0 disables the secondary serial port 328 and a "1" enables the secondary serial port 328.

Movement of data to a proper transmission area is effectuated by the data router 412. The data router 412 discriminates between real-time and non real-time data, or circuit switched and packet switched data—packet switched data such as SMS. If real-time data is received, then it is passed directly on to the RF transceiver 316. However, if non real-time data is received, such as SMS, then it is queued in a non real-time transmission buffer 416 area of RAM 308 or an equivalent area in the RF transceiver 316.

Figure 5:
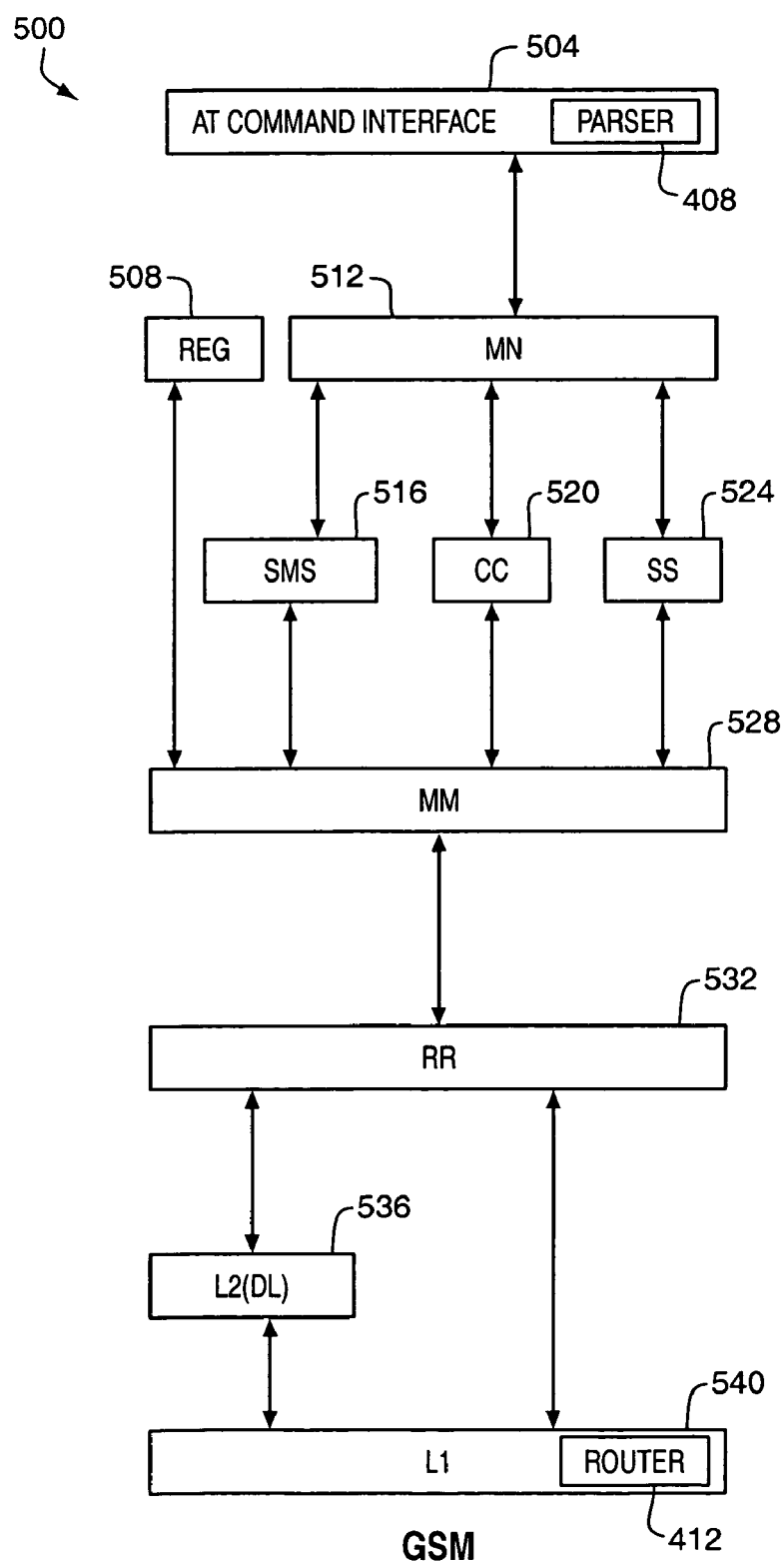
FIG. 5 depicts a wireless protocol stack, including the functional elements of the dual port wireless modem.

FIG. 5 depicts a wireless protocol stack 500. The base components of GSM protocol stack 500 are generally known in the art. For example, the base software components of GSM protocol stack 500 are available from various venders such as debis Systemhaus in Berlin, Germany, CONDAT Datensystem Gmblt in Hannover, Germany, and other wireless communications vendors. According to one embodiment, the GSM protocol stack 500 can be implemented in a variety of logic devices or in computer-readable code executed by an embedded microprocessor already part of the wireless modem. However, the illustrated protocol stack 500 differs from existing wireless protocol stacks in that it further comprises the AT command parser 408 and the data router 412, which are described above.

Aspects of the present invention are preferably embodied in software code that comprises the AT command interface 504. For example, the AT command interface 504 includes the AT command parser 408, which monitors the serial ports for AT commands from the terminal equipment. Based on a decision by the AT command interface, commands can either be passed on to the MN interface 512, or to another algorithm in the microprocessor 304. Other aspects of the invention are embodied in the physical layer 540, which preferably controls the RF transceiver 316 and manages the transmission buffer 416. Incoming data, for example an SMS message, from a remote device can be processed by the physical layer 540 and in turn passed up the GSM protocol stack 500 for further processing by the AT command parser 408.

A general description of the remainder of the wireless protocol stack 500 is now appropriate. The mobile network man-machine interface (MN) 512 receives data (for example from the AT command interface 504) and passes the data to the appropriate messaging service—e.g., a short message service (SMS) 516, a call control service (CC) 520, or a supplementary service (SS) 524. A registration element 508 will provide the mobility management layer 528 with necessary information about the data and the GSM network.

From each of layers 508, 516, 520 and 524 data flow is then directed to and from the mobility management layer (MM) 528.

The mobility management layer 528 establishes, maintains, and releases connections with the GSM network. From the mobility management layer 528, data and control is passed to the radio resource management layer (RR) 532. The radio resource management layer 532 establishes physical connections over the radio interface (for example RF transceiver 120) for call-related signaling and traffic channels with a base station in the GSM network.

Connected to the radio resource management layer 532 is the physical layer (L1) 540. The physical layer 540 processes call-related signaling and traffic channels directly from the radio resource layer 532, and also processes the data sent from the data link layer (L2) 536.

Figure 6:
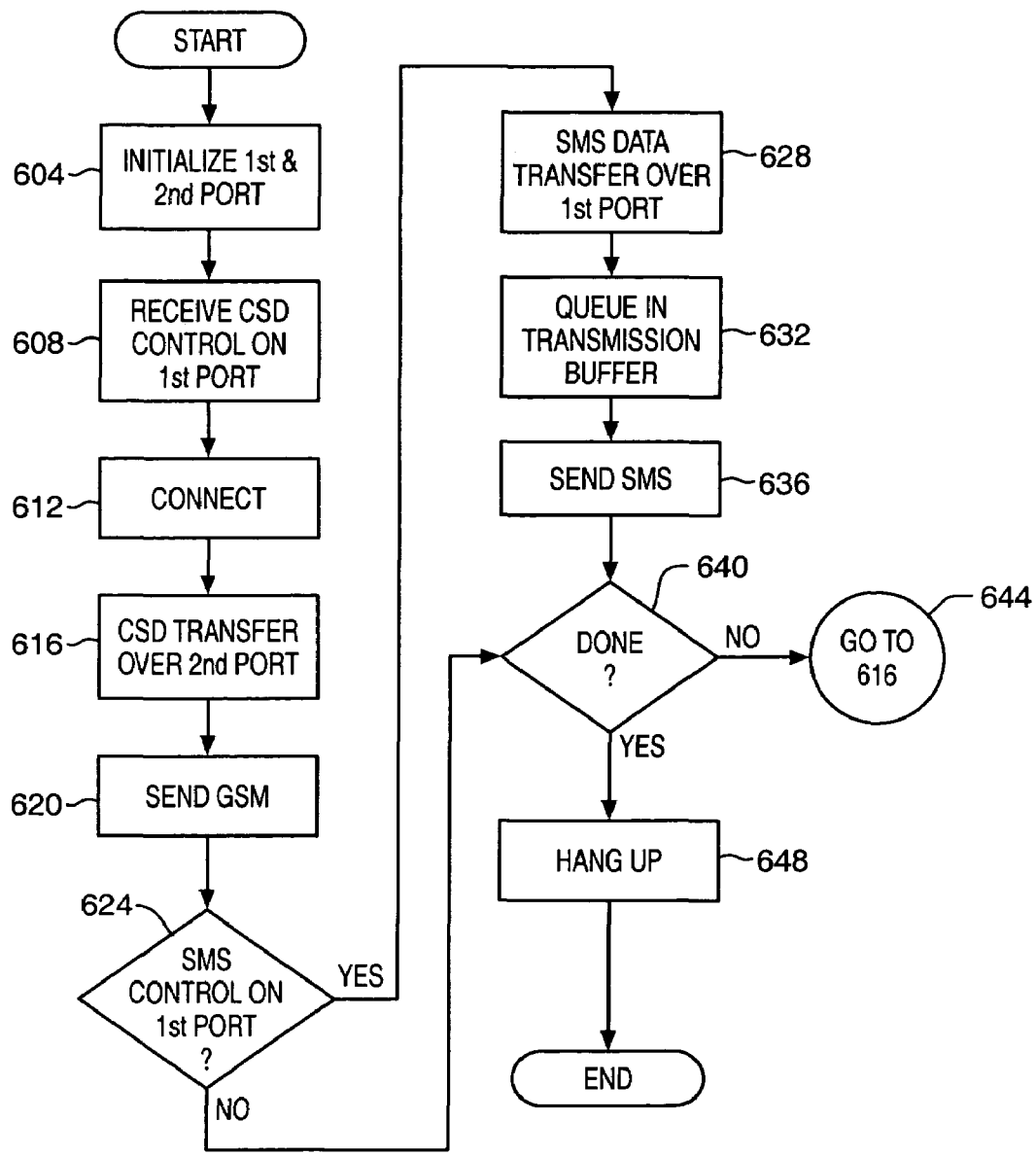
FIG. 6 is a flowchart depicting a processing methodology for the dual port wireless modem.

FIG. 6 depicts a detailed flowchart for the computer readable medium stored in ROM 312, such as executable object code, that is performed by the wireless modem 300, or a combination of the microprocessor 304, the dual port serial port 320, and RF transceiver 316. Usually, just prior the execution, the computer readable medium is moved from ROM 312 to an execution memory area, such as a reserved portion of RAM 308.

In step 604, both the primary serial port 324 and the secondary serial port 328 of the dual port serial port 320 are initialized. Usually, this involves sending a command string to the serial port 320 that specifies operating parameters for the modem. For instance, the baud, number of data bits, and parity option for each serial port can be specified. Of course, these values can vary depending on the type of terminal equipment attached to the wireless modem 300, as well as the throughput of the RF transceiver 316.

In step 608, a control signal is received on the primary serial port 324 indicating that a CSD call is to be made. At step 612, the "ATDTxxxxxxx" command causes the wireless modem to connect to a remote device using the RF transceiver 316. The wireless modem will usually receive a "CONNECT baud" signal from the remote device that indicates a circuit has been established. The "CONNECT baud" signal can be repeated back to the terminal equipment over either the primary or secondary serial port.

In step 616, circuit switched data transfer occurs between the wireless modem and the remote device. According to an aspect of the invention, the circuit switched data is received at the wireless modem 300 over the secondary serial port 328 from the terminal equipment. In step 620, the real-time or circuit switched data received at the dual port serial port 320 is modulated with the RF transceiver 316, preferably using a GSM protocol.

While the circuit switched data transfer is occurring, the primary serial port 324 of the wireless modem 300 explicitly polls, or waits for an interrupt signal from the terminal equipment. In step 624, it is shown that the primary serial port 324 is tested for a short message service message (or "SMS") command. If a SMS command is received, then processing continues to step 628, otherwise processing continues to step 640.

In step 628, the SMS command is parsed, so that the command can be separated from the SMS message data. Alternatively, a subsequent message can include the SMS data. In step 632, the data from the SMS message is stored in a transmission buffer 416 for later transmission by the RF transceiver 316. When the RF transceiver 316 can, it transmits the SMS data to the remote device in step 636. It is noted that the transmission may be immediate, or there may be a short delay. According to one embodiment, the SMS data is transmitted by the RF transceiver 316 simultaneously, but over a separate frequency (or channel) than the real-time data or CSD.

In step 640, a test is performed to determine whether the data transfer is complete, either for the SMS or CSD transfer. If the data transfer is complete, for example and "ATH" or "AT~S2PORT0" command is detected by the AT command parser 408, then the wireless modem causes a disconnect or hang-up command to be sent by the RF transceiver 316. Otherwise, as shown in connector 644, the process continues to step 616, where the CSD call, which has continued uninterrupted during performance of steps 624 through 636, is continued.

An advantage of the present invention is that the circuit switched data call, or a real-time transfer of data does not have to be interrupted when packet switched, or SMS data is also received by the external wireless modem (from either the terminal equipment or the external device). Second, two serial ports, instead of one, are available for sending and receiving data and commands over the RF transceiver. This has the advantage of allowing intensive real-time data monitoring over one serial port, and low bandwidth alarm triggering events to be communicated simultaneously over, or received by the second serial port. A further advantage is that more than one external device can be connected to the wireless modem. Finally, while the description of the present invention has been described with respect to outgoing traffic from the terminal equipment to the remote device. The converse, data traffic from the remote device to the terminal equipment (or just the external wireless modem), can also occur in a substantially similar fashion. These and other advantages will be apparent upon review of the detailed description and figures.

What is claimed is:

1. An apparatus comprising:
   a microprocessor;
   an RF transceiver coupled to the microprocessor;
   a transmission buffer coupled to the microprocessor;
   a dual port serial port coupled to the microprocessor, the dual port serial port having a primary serial port and a secondary serial port, the secondary serial port to receive data for circuit switched data transfer from a terminal equipment, and the primary serial port to receive data for packet switched data transfer from the terminal equipment; and
   a data router, the data router to direct data received over the primary serial port to the transmission buffer, and to direct data received over the secondary serial port to the RF transceiver.

2. The apparatus of claim 1, wherein the dual port serial port is to simultaneously receive the data for the circuit switched data transfer over the secondary serial port and command and control signals over the primary serial port.

3. The apparatus of claim 1, wherein the dual port serial port is to maintain the circuit switched data transfer using the RF transceiver and simultaneously transmit, also using the RF transceiver, the packet switched data transfer.

4. The apparatus of claim 1, further comprising a GSM protocol stack, and wherein the packet switched data transfer comprises a short message service data transfer.

5. The apparatus of claim 1, further comprising a command parser to monitor the secondary serial port for command and control signals, and wherein the data router is to pass the command and control signals from the secondary port to an execution memory of the random access memory for processing.

6. An apparatus comprising:
an RF transceiver to transmit and receive wireless signals;
a dual port serial port coupled to the RF transceiver, the dual port serial port having a primary serial port and a secondary serial port, the secondary serial port to receive data for circuit switched data transfer from a terminal equipment, and the primary serial port to receive data for packet switched data transfer from the terminal equipment;
a transmission buffer coupled to the dual port serial port; and
a data router, the data router to direct data received over the primary serial port to the transmission buffer, and to direct data received over the secondary serial port to the RF transceiver.

7. The apparatus of claim 6, further comprising a read only memory coupled to the RF transceiver, the read only memory including a wireless protocol stack and a command parser.

8. The apparatus of claim 7, wherein the command parser is to examine command and control signals received over the primary serial port.

9. The apparatus of claim 7, wherein the command parser is to monitor the secondary serial port for the command and control signals, and wherein the data router is to pass the command and control signals from the secondary port to an execution memory of the random access memory for processing.

10. The apparatus of claim 7, further comprising a random access memory coupled to the RF transceiver.

11. The apparatus of claim 6, wherein the dual port serial port is to simultaneously receive the circuit switched data over the secondary serial port and command and control signals over the primary serial port.

12. The apparatus of claim 6, wherein the dual port serial port is to maintain the circuit switched data transfer using the RF transceiver and simultaneously transmit, also using the RF transceiver, the packet switched data transfer.

13. The apparatus of claim 6, wherein the wireless protocol stack comprises a GSM protocol stack, and wherein the packet switched data transfer comprises a short message service data transfer.

14. A method comprising:
receiving circuit switched data over a secondary serial port of a dual port serial port, the dual port serial port having a primary serial port and the secondary serial port, wherein the primary and secondary serial ports are both coupled with a terminal equipment;
transmitting the circuit switched data using an RF transceiver;
receiving packet switched data over the primary serial port, wherein the packet switched data is received concurrently with the circuit switched data;
queuing the packet switched data; and
transmitting the packet switched data using the RF transceiver after said queuing the packet switched data.

15. The method of claim 14, further comprising routing data received over the primary serial port to a transmission buffer.

16. The method of claim 15, wherein said transmitting the packet switched data using the RF transceiver comprises fetching the data from the transmission buffer.

17. The method of claim 14, wherein said transmitting the packet switched data comprises transmitting the packet switched data using the RF transceiver using a short message service protocol.

18. The method of claim 14, wherein said transmitting the circuit switched data comprises transmitting the circuit switched data using the RF transceiver using a GSM protocol.

19. The method of claim 14, further comprising:
using the circuit switched data for real-time data monitoring; and
using the packet switched data to communicate an alarm triggering event.

20. The method of claim 14, further comprising:
connecting a first external device to the primary serial port; and
connecting a second external device to the secondary serial port.

21. A computer readable medium having stored therein one or more sequences of instructions to cause one or more microprocessors to:
transmit circuit switched data received from a terminal equipment over a secondary serial port of a dual port serial port using an RF transceiver;
queue packet switched data received concurrently with the circuit switched data from the terminal equipment over a primary serial port of the dual port serial port; and
transmit the packet switched data using the RF transceiver after the queuing of the packet switched data.

22. The computer readable medium of claim 21, wherein the one or more sequences of instructions further comprise instructions to cause the one or more microprocessors to:
route the packet switched data to a transmission buffer.

23. The computer readable medium of claim 21, wherein the instructions to transmit the packet switched data further comprise instructions to:
transmit the packet switched data using the RF transceiver using a short message service protocol.

24. The computer readable medium of claim 21, wherein the instructions to transmit the circuit switched data further comprise instructions to:
transmit the circuit switched data using the RF transceiver using a GSM protocol.

25. An apparatus comprising:
a microprocessor;
a read only memory communicatively coupled with the microprocessor to store code;
a random access memory communicatively coupled with the microprocessor to store runtime data;
a radiofrequency transceiver communicatively coupled with the microprocessor, the radiofrequency transceiver to operate with the microprocessor to transmit and receive wireless signals;
a dual port communicatively coupled with the microprocessor, the dual port having a first port and a second port, the first port to receive data for real time data transfer from a device, the second port to receive data for non-real time data transfer from the device; and
a transmission buffer communicatively coupled with the microprocessor and the second port to store the data for non-real time data transfer prior to transmission of the data for non-real time data transfer.

26. The apparatus of claim 25, wherein the first and second ports comprise different serial ports.

27. The apparatus of claim 25, wherein the data for real time data transfer comprises circuit switched data, and wherein the data for non-real time data transfer comprises packet switched data.

* * * * *